United States Patent
Suzuki (10) Patent No.: US 11,285,794 B2
(45) Date of Patent: Mar. 29, 2022

(54) VEHICLE

(71) Applicant: HONDA MOTOR CO., LTD., Tokyo (JP)

(72) Inventor: Takanori Suzuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 312 days.

(21) Appl. No.: 16/548,258

(22) Filed: Aug. 22, 2019

(65) Prior Publication Data
US 2020/0079200 A1 Mar. 12, 2020

(30) Foreign Application Priority Data

Sep. 12, 2018 (JP) .............................. JP2018-170800

(51) Int. Cl.
| | | |
|---|---|---|
| *B60K 1/00* | (2006.01) | |
| *B62D 25/08* | (2006.01) | |
| *B60R 16/02* | (2006.01) | |
| *B60K 1/04* | (2019.01) | |

(52) U.S. Cl.
CPC ............ *B60K 1/00* (2013.01); *B60R 16/0207* (2013.01); *B62D 25/08* (2013.01); *B60K 1/04* (2013.01); *B60K 2001/0438* (2013.01)

(58) Field of Classification Search
CPC .... B60K 1/00; B60K 1/04; B60K 2001/0438; B60K 2001/008; B60K 2001/0405; B60K 2001/0411; B62D 25/08; B62D 25/2045; B62D 25/20; B62D 25/082; B62D 25/14;
(Continued)

(56) References Cited

U.S. PATENT DOCUMENTS 7,144,039 B2 * 12/2006 Kawasaki ................ B60K 1/04
280/784
7,222,692 B2 * 5/2007 Masuda .................... B60K 1/00
180/291
(Continued)

FOREIGN PATENT DOCUMENTS

| JP | H08-310252 A | 11/1996 |
|---|---|---|
| JP | 2008-062780 A | 3/2008 |

(Continued)

OTHER PUBLICATIONS

Feb. 4, 2020, Japanese Office Action issued for related JP Application No. 2018-170800.

*Primary Examiner* — James M Dolak
(74) *Attorney, Agent, or Firm* — Paratus Law Group, PLLC (57) ABSTRACT

A vehicle includes an electrical device, a frame member configured to hold the electric device, and a bracket connecting a vehicle structural member and the frame member. The frame member includes: a frame main body having an electrical device accommodation portion configured to accommodate the electrical device and a bracket attachment portion to which the bracket is attached; and an upper frame which is attached to the frame main body and covers the electric device accommodated in the electric device accommodation portion. The bracket attachment portion is attached to the bracket in a direction from the bottom to the top. The upper frame is attached to the frame main body in a direction from the top to the bottom.

11 Claims, 7 Drawing Sheets

(58) Field of Classification Search
CPC . B60R 16/0207; B60R 16/0239; B60R 16/02; B60R 16/0215
See application file for complete search history.

(56) References Cited

U.S. PATENT DOCUMENTS

| | | | | |
|---|---|---|---|---|
| 7,688,582 | B2* | 3/2010 | Fukazu | B60L 50/66 361/690 |
| 7,874,395 | B2* | 1/2011 | Taji | H02K 7/006 180/300 |
| 8,757,304 | B2* | 6/2014 | Amano | B60L 3/0069 180/65.1 |
| 8,776,920 | B2* | 7/2014 | Suzuki | B60L 50/16 180/65.21 |
| 8,820,467 | B2* | 9/2014 | Lamoine | B60K 1/00 180/299 |
| 8,899,360 | B2* | 12/2014 | Mochizuki | B60L 50/60 180/65.1 |
| 9,073,426 | B2* | 7/2015 | Tachikawa | B60L 50/64 |
| 9,139,074 | B2* | 9/2015 | Jarocki | B60L 3/0007 |
| 9,371,009 | B2* | 6/2016 | Ishikawa | H01M 8/2483 |
| 9,623,756 | B2* | 4/2017 | Suzuki | B60L 3/003 |
| 9,827,923 | B2* | 11/2017 | Matano | B60L 7/14 |
| 10,358,024 | B2* | 7/2019 | Yugami | B62D 21/152 |
| 10,434,861 | B2* | 10/2019 | Narisawa | B60K 1/04 |
| 10,464,613 | B2* | 11/2019 | Okura | B62D 25/085 |
| 10,923,755 | B2* | 2/2021 | Naito | B60L 50/72 |
| 10,967,914 | B2* | 4/2021 | Sasaki | B60R 16/02 |
| 2008/0062622 | A1 | 3/2008 | Fukazu et al. | |
| 2013/0119760 | A1* | 5/2013 | Amano | B60R 16/0239 307/10.1 |

FOREIGN PATENT DOCUMENTS

| | | |
|---|---|---|
| JP | 2009-061913 A | 3/2009 |
| JP | 2011-020627 A | 2/2011 |
| JP | 2013-103586 A | 5/2013 |
| JP | 2013-103587 A | 5/2013 |
| JP | 2013-103589 A | 5/2013 |

* cited by examiner

VEHICLE

CROSS-REFERENCE TO RELATED APPLICATIONS

The present application claims the benefit of priority of Japanese Patent Application No. 2018-170800, filed on Sep. 12, 2018, the content of which is incorporated herein by reference.

TECHNICAL FIELD

The present invention relates to a vehicle equipped with an electric device held by a frame.

BACKGROUND ART

In a vehicle described in JP-A-2013-103586, a PCU, which is an electric device, is accommodated in a motor room in which a motor is disposed, in a state of being held by a frame.

SUMMARY

When mounting an electric device on a vehicle, easiness (hereinafter sometimes referred to as assemblability) in assembly at the time of assembly of the vehicle is required. On the other hand, after assembling the vehicle, maintenance of the electrical device may be required. In maintenance of the electrical device, accessibility (hereinafter sometimes referred to as maintainability) to the electrical device is required.

The invention provides a vehicle which is excellent in assemblability and maintainability of an electric device.

According to an aspect of the invention, there is provided a vehicle including: an electrical device; a frame member configured to hold the electric device; and a bracket connecting a vehicle structural member and the frame member, wherein: the frame member includes: a frame main body having an electrical device accommodation portion configured to accommodate the electrical device and a bracket attachment portion to which the bracket is attached; and an upper frame which is attached to the frame main body and covers the electric device accommodated in the electric device accommodation portion; the bracket attachment portion is attached to the bracket in a direction from the bottom to the top; and the upper frame is attached to the frame main body in a direction from the top to the bottom.

Effects

According to the invention, at the time of assembling the vehicle, the electric device unit having the electric device mounted on the frame member can be assembled from below, so that the assemblability of the electrical device is enhanced. In addition, at the time of maintenance of the electrical device, it is possible to access the electrical device from above without removing the electrical device unit from the vehicle, so that the maintainability of the electrical device is enhanced.

DESCRIPTION OF EMBODIMENTS

Hereinafter, an embodiment of a vehicle according to the present invention will be described based on the drawings. The drawings shall be viewed in the direction of reference numerals, and in the following description, the front and rear, the left and right, and the up and down shall be described according to the directions viewed from an operator. In the drawings, the front of the vehicle is indicated by Fr, the rear by Rr, the left by L, the right by R, the upper by U, and the lower by D.

Figure 1:
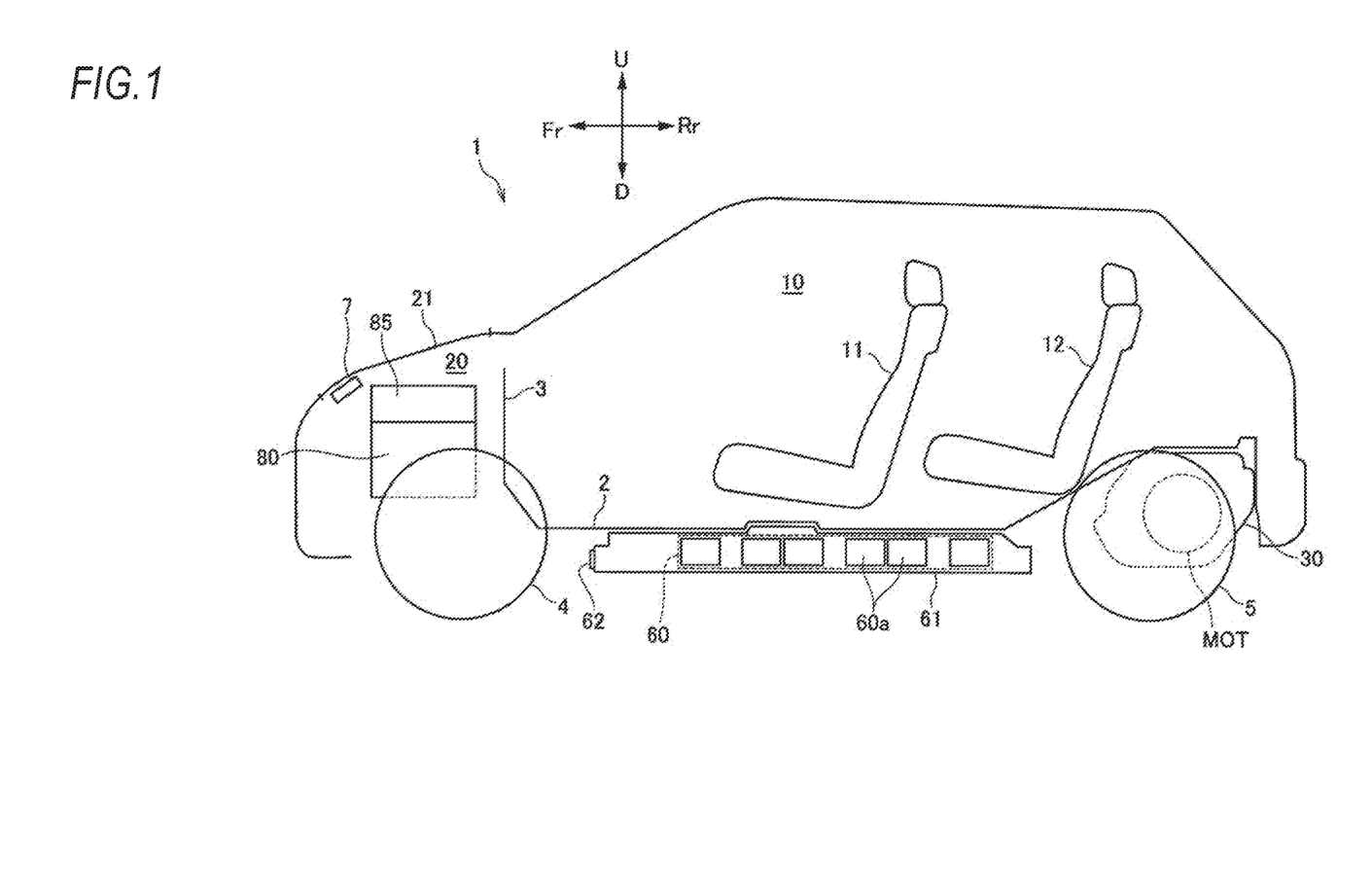
FIG. 1 is a schematic side view illustrating an overall structure of a vehicle according to an embodiment of the invention.
Figure 2:
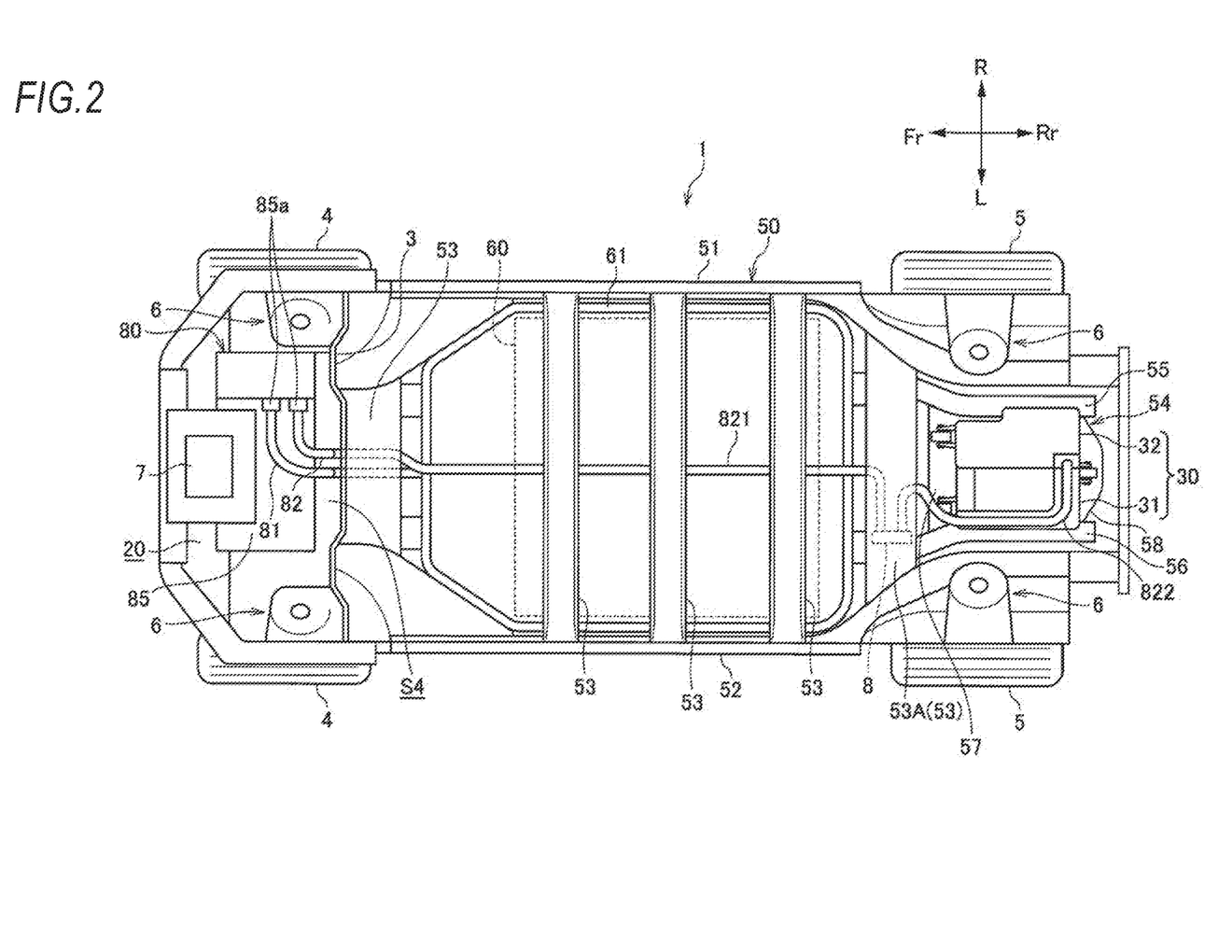
FIG. 2 is a plan view illustrating an underfloor structure of the vehicle of FIG. 1.

As illustrated in FIGS. 1 and 2, a vehicle 1 according to an embodiment of the invention is defined by a floor panel 2 and a dashboard 3 in a compartment 10 and a front room 20 in front of the compartment 10. A front seat 11 and a rear seat 12 are provided in the compartment 10. Below the floor panel 2 at the rear of the rear seat 12, a driving device unit 30 is provided. The driving device unit 30 drives left and right rear wheels 5. That is, in the vehicle 1, the left and right rear wheels 5 are drive wheels and left and right front wheels 4 are driven wheels. Each front wheel 4 and each rear wheel 5 are supported by a vehicle body frame 50 via suspensions A illustrated) supported respectively by suspension support portions 6.

Below the compartment 10, a battery 60 constituted of a plurality of battery modules 60a is disposed. The battery 60 is accommodated in a battery case 61 and disposed below the floor panel 2. A battery connector 62 is provided on the front of the battery case 61.

The vehicle body frame 50 includes a pair of left and right side members 51 and 52 extending in a front and rear direction, and a plurality of cross members 53 extending in a left and right direction and connecting the side members 51 and 52, and a subframe 54 having a rectangular shape so as to surround the driving device unit 30. The subframe 54 includes a pair of sub-side members 55 and 56 supported by both side members 51 and 52 and a front frame member 57 and a rear frame member 58 connecting the two sub-side members 55 and 56. The driving device unit 30 includes a drive device 31 accommodating a motor MOT as an electric motor and a Power Control Unit (PCU) 32 as a motor control device for controlling the motor MOT. The drive device 31 and the PCU 32 are electrically connected via a bus bar (not illustrated).

Figure 3:
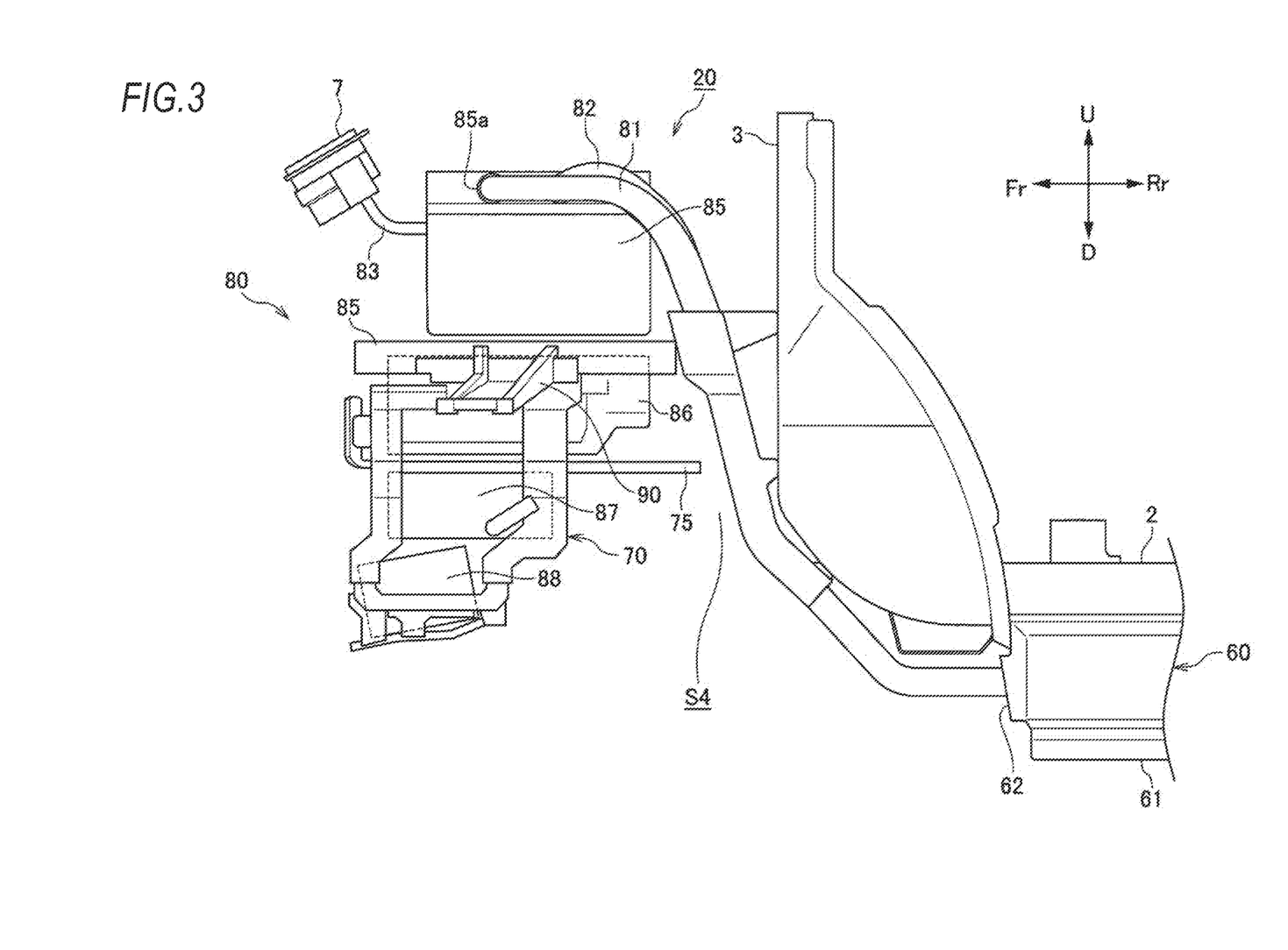
FIG. 3 is a side view of an electrical device unit in a front room of the vehicle of FIG. 1.

As illustrated in FIG. 3, the front room 20 is provided with a charging port 7, a junction box 85, and an auxiliary device unit 80. The accessory unit 80 includes a charger 86, a DC-DC converter 87, a battery heater 88 (hereinafter also referred to as electric devices), and an auxiliary device frame 70 for holding these electric devices.

Next, the auxiliary device frame 70 will be described in detail with reference to FIGS. 4 to 7.

Figure 5:
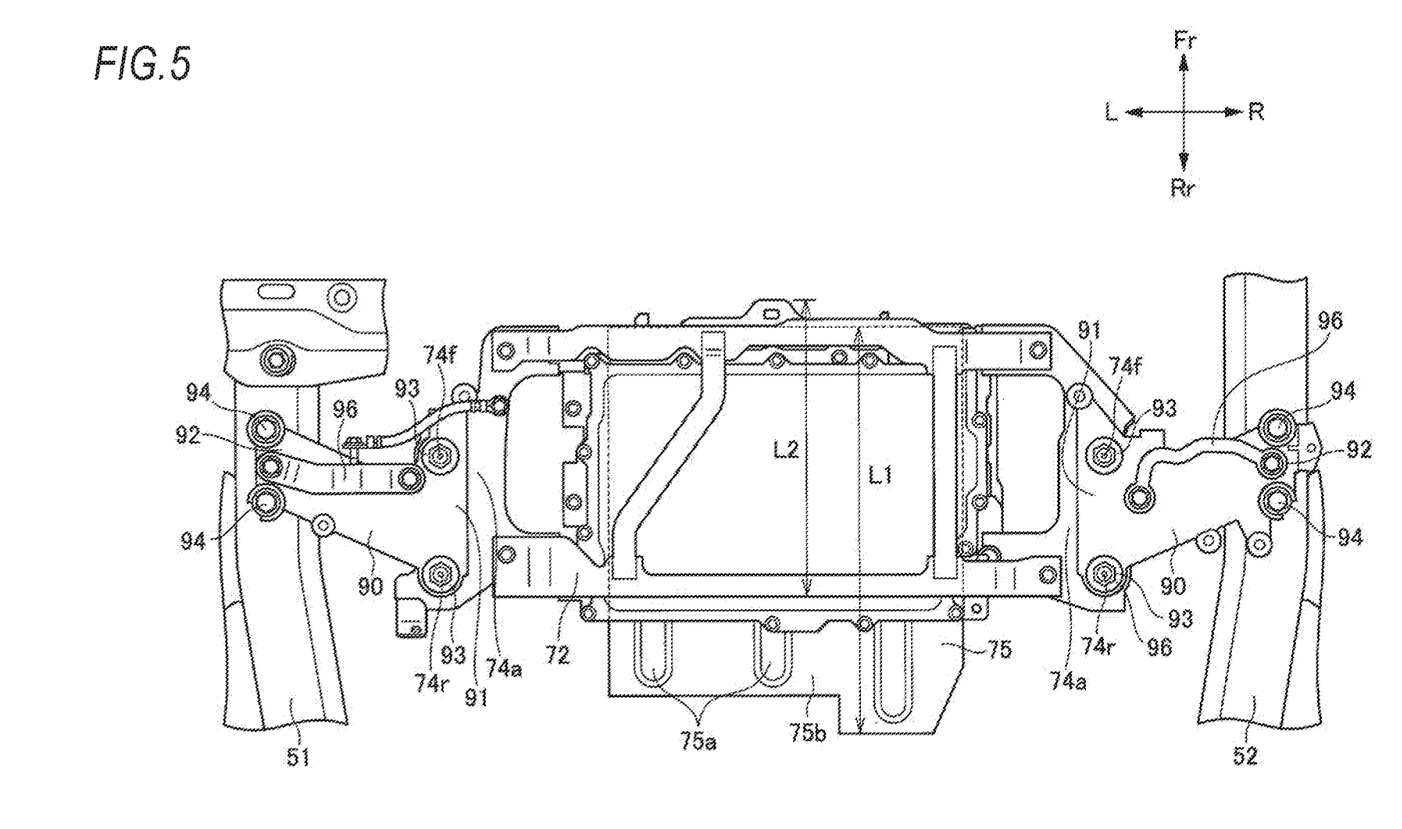
FIG. 5 is a plan view of the electrical device unit of FIG. 3.
Figure 6:
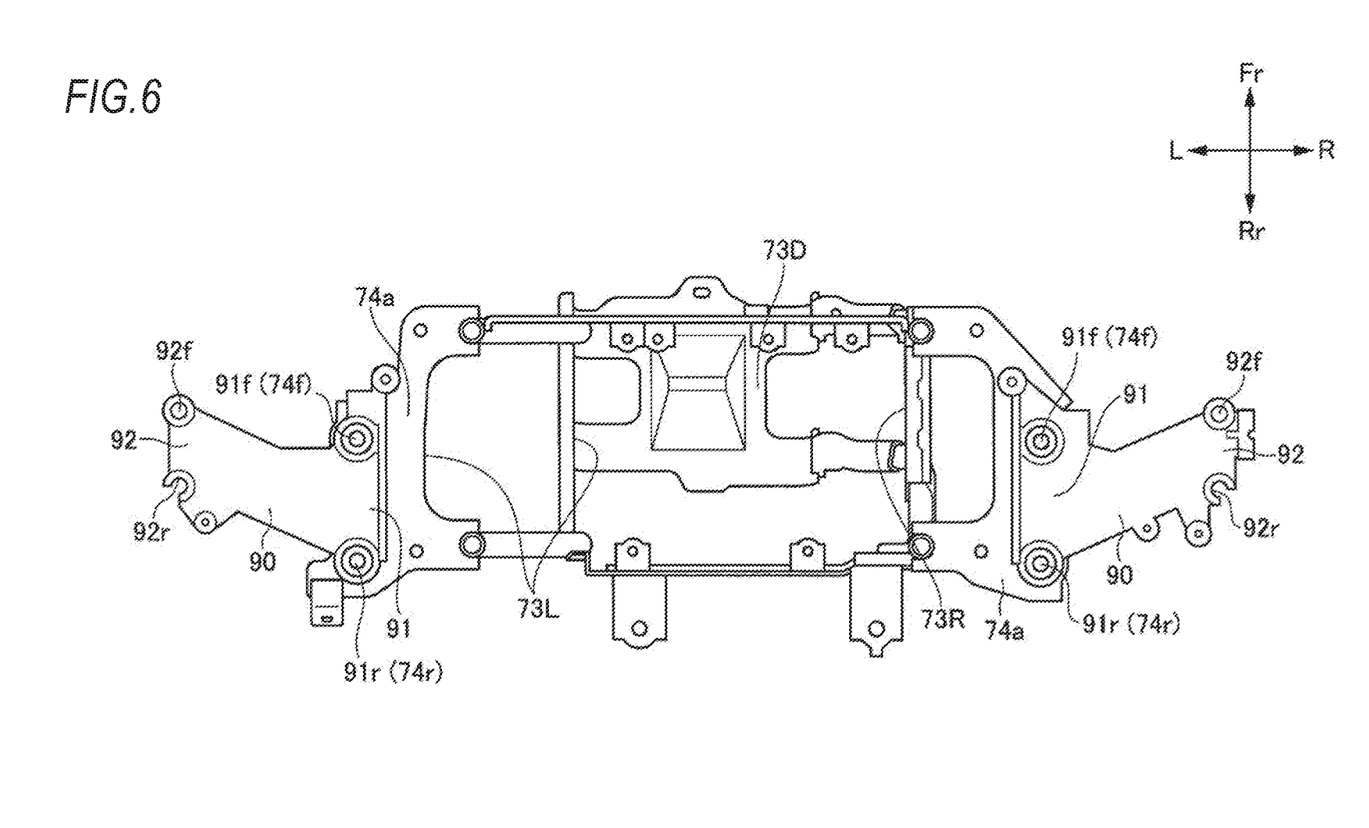
FIG. 6 is a plan view of an auxiliary device frame.

In the auxiliary device frame 70, the charger 86, the DC-DC converter 87, and the battery heater 88 are arranged in the order from the top to the bottom and the auxiliary device frame is fixed to the side members 51 and 52 via brackets 90 as illustrated in FIG. 5. In the electric devices held by the auxiliary device frame 70, the length in a vehicle width direction is shortened as it goes from the upper side to the lower side.

Figure 4:
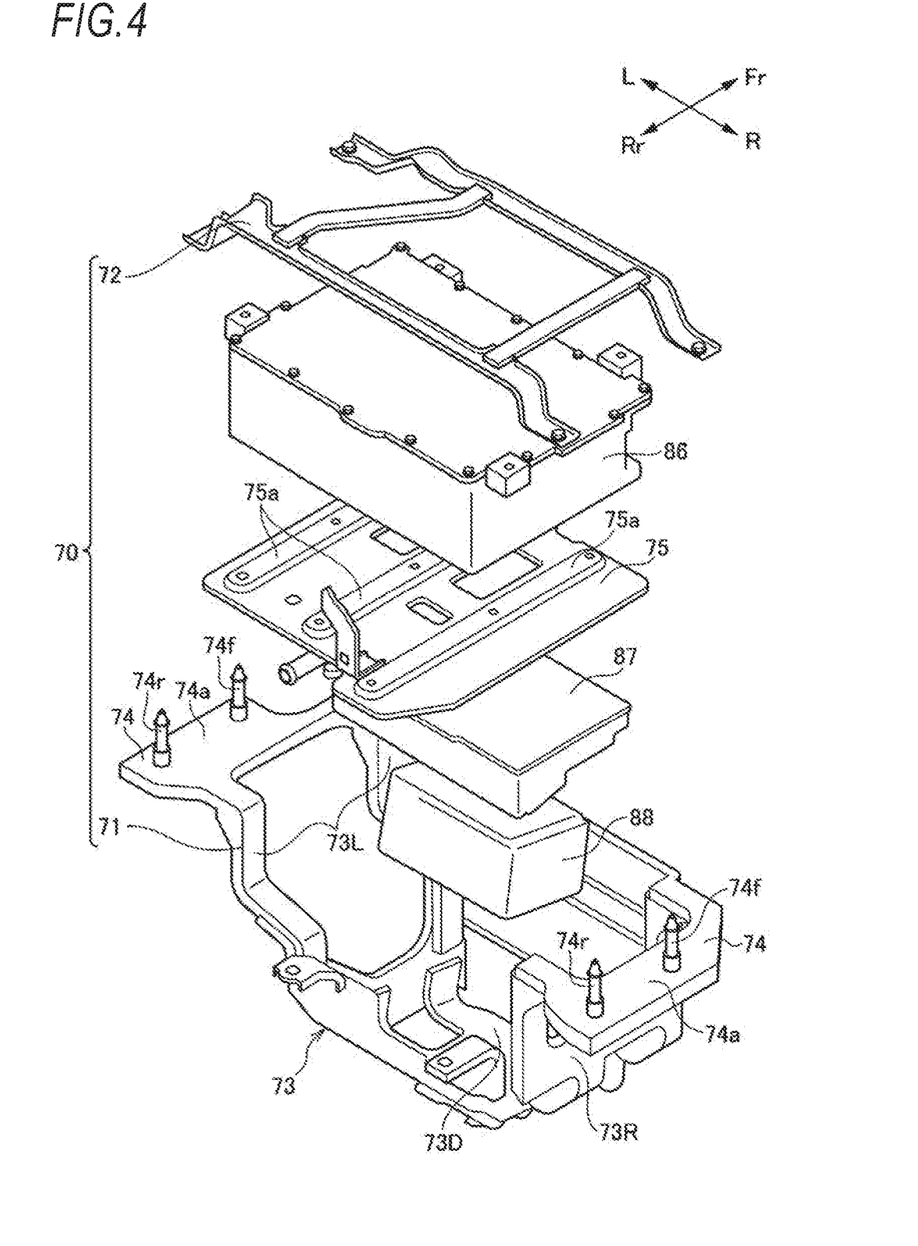
FIG. 4 is an exploded perspective view of the electrical device unit of FIG. 3.
Figure 7:
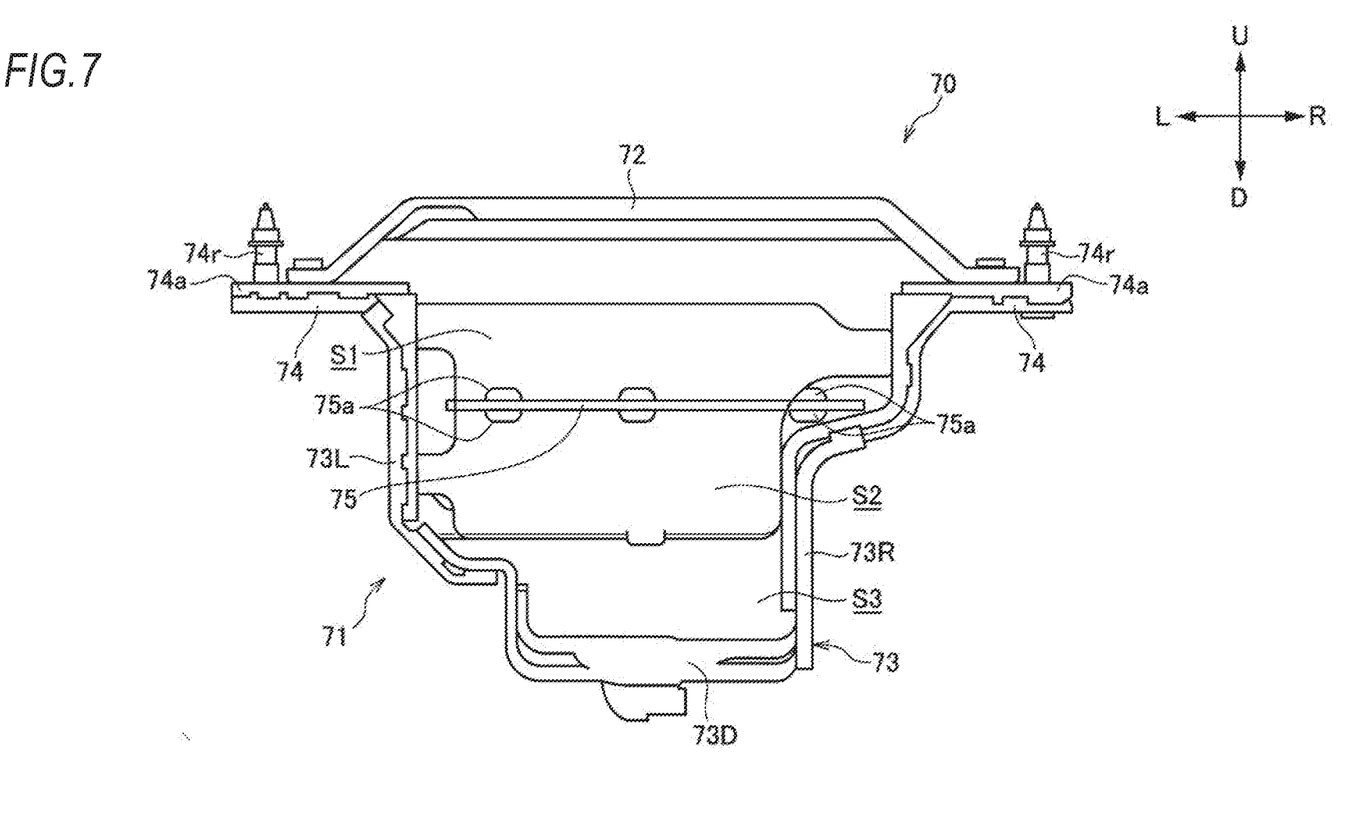
FIG. 7 is a rear view of the auxiliary device frame.

As illustrated in FIGS. 4 and 7, the auxiliary device frame 70 includes a frame main body 71 of a substantially U shape as viewed from the front and an upper frame 72 of a ladder shape attached to an upper portion of the frame main body 71.

The frame main body 71 has an auxiliary device accommodation portion 73 for accommodating the charger 86, the DC-DC converter 87, and the battery heater 88 and a bracket attachment portion 74 to which the bracket 90 is attached. The auxiliary device accommodation portion 73 has a left wall portion 73L and a right wall portion 73R opposite in the vehicle width direction and a bottom wall portion 73D connecting the lower end portion of the left wall portion 73L and the lower end portion of the right wall portion 73R. In the auxiliary device accommodation portion 73, an upper space S1, a middle space S2, and a lower space S3 are defined in order from the upper side. In the upper space S1, the middle space S2, and the lower space S3, the length in the vehicle width direction is shortened in the order from the top to the bottom. The charger 86 is disposed in the upper space S1, and the DC-DC converter 87 is disposed in the middle space S2, and further the battery heater 88 is disposed in the lower space S3.

In the auxiliary device accommodation portion 73, a reinforcing plate 75 is provided between the upper space S1 and the middle space S2. In the reinforcing plate 75, reinforcing portions 75a of a convex shape extending in the front and rear direction are formed on upper and lower surfaces respectively. As illustrated in FIG. 5, a length L1 of the reinforcing plate 75 in the front and rear direction is longer than a length L2 of the frame main body 71 in the front and rear direction and a rear end portion 75b of the reinforcing plate 75 protrudes further rearward than the frame main body 71 and the electric devices accommodated in the auxiliary device accommodation portion 73.

The upper frame 72 is attached to the frame main body 71 in a direction from the top to the bottom with the charger 86, the DC-DC converter 87, and the battery heater 88 accommodated in the auxiliary device accommodation portion 73. The junction box 85 is fixed to an upper portion of the upper frame 72.

As illustrated in FIGS. 4 to 7, the bracket attachment portion 74 of the frame main body 71 includes flange portions 74a extending outward in the vehicle width direction from the upper end portions of the left wall portion 73L and the right wall portion 73R of the auxiliary device accommodation portion 73 and a front fastening member 74f and a rear fastening member 74r disposed in each flange portion 74a so as to be spaced apart in the front and rear direction and extend upward. The front fastening member 74f and the rear fastening member 74r are, for example, stud bolts and are attached to the bracket 90 in a direction from the bottom to the top.

The bracket 90 has a substantially parallelogram shape and includes a frame attachment portion 91 attached to the bracket attachment portion 74 of the frame main body 71 and a side member attachment portion 92 attached to the side members 51 and 52.

The frame attachment portion 91 is provided with a front fastening hole 91f and a rear fastening hole 91r through which the front fastening member 74f and the rear fastening member 74r of the bracket attachment portion 74 pass. The front fastening member 74f and the rear fastening member 74r of the bracket attachment portion 74 are inserted from below into the front fastening hole 91f and the rear fastening hole 91r of the frame attachment portion 91, and are fastened by nuts 93 from above.

The side member attachment portions 92 are respectively provided with front fixing holes 92f and rear fixing holes 92r through which bolts 94 pass and are respectively fixed to the side members 51 and 52 by the bolts 94 passing through the front fixing holes 92f and the rear fixing holes 92r from above.

In this case, the frame attachment portion 91 is located closer to the compartment 10 (rearward) than the side member attachment portion 92. That is, the front fastening hole 91f of the frame attachment portion 91 is located closer to the compartment 10 (rearward) than the front fixing hole 92f of the side member attachment portion 92 and the rear attachment hole 91r of the frame attachment portion 91 is located closer to the compartment 10 (rearward) than the rear fixing hole 92r of the side member attachment portion 92.

Further, the rear fixing hole 92r of the side member attachment portion 92 has a C shape in which the outer side in the vehicle width direction is cut away.

In the auxiliary device unit 80 configured as described above, the charger 86, the DC-DC converter 87, and the battery heater 88 are accommodated in the auxiliary device accommodation portion 73 of the auxiliary device frame 70, and the auxiliary device unit 80 is accommodated in the front room 20 in a state where the junction box 85 is fixed to the upper portion of the upper frame 72. Specifically, the auxiliary device unit 80 is inserted from below into the front room 20 of the vehicle 1 suspended on a production line. The brackets 90 is fixed to the side members 51 and 52 in advance and the front fastening members 74f and the rear fastening members 74r of the bracket attachment portions 74 are inserted into the front fastening holes 91f and the rear fastening holes 91r provided in the frame attachment portions 91 of the brackets 90. Then, by fastening the nuts 93 to the front fastening members 74f and the rear fastening members 74r of the bracket attachment portions 74 from above, the auxiliary device unit 80 is fixed to the side members 51 and 52 via the brackets 90. As described above, since the auxiliary device unit 80 can be assembled from below, mixed flow production can be performed on the same production line as a normal engine vehicle.

As illustrated in FIGS. 2 and 3, the junction box 85 is disposed at the uppermost portion of the front room 20 and electrically connects a quick charge cable 83 extending from the charging port 7 and a battery cable 81 extending from the battery connector 62 of the battery 60. Also, the junction box 85 is electrically connected to the driving device unit 30 via a PCU cable 82.

The PCU cable 82 connected to the junction box 85 has a first cable 821 extending from the junction box 85 and a second cable 822 extending from the PCU 32 and the first cable 821 and the second cable 822 are connected to each other via a joint box 8 fixed to the lower surface of the cross member 53 (hereinafter, this cross member 53 is referred to as a support cross member 53A) located between the battery 60 and the driving device unit 30.

The battery cable 81, which is a high-voltage cable, and the PCU cable 82 are disposed in a reinforcing space S4 surrounded by the auxiliary device frame 70, the dashboard 3, and a pair of the side members 51 and 52. Therefore, at the time of the collision of the vehicle 1, the battery cable 81 and the PCU cable 82 can be prevented from being damaged by the approach of the collision object, and thus the battery cable 81 and the PCU cable 82 can be protected.

The battery cable 81 and the PCU cable 82 are connected to a JB connector 85a of the junction box 85 from one side (left side in the embodiment) in the vehicle width direction and the battery cable 81 and the PCU cable 82 are disposed further on one side (left side in the embodiment) in the vehicle width direction than the JB connector 85a in the reinforcing space S4. Therefore, even when the auxiliary device frame 70 is pushed to the dashboard 3 side, the collision load acts in a direction to alleviate the bending of the battery cable 81 and the PCU cable 82 with respect to a connection direction of the JB connector 85a, and thus it is possible to suppress breakage and disconnection of the battery cable 81 and the PCU cable 82.

In addition, in the auxiliary device frame 70, the reinforcing plate 75 longer than the length of the frame main body 71 in the front and rear direction is provided between the charger 86 and the DC-DC converter 87, and thus the rigidity of the auxiliary device frame 70 can be enhanced, and further, at the time of the collision of the vehicle 1, the reinforcing plate 75 receives the impact. As a result, it is possible to suppress the damage to the electrical device.

Further, in the bracket 90, the frame attachment portion 91 is positioned closer to the compartment 10 (rearward) than the side member attachment portion 92, so that the load applied to the auxiliary device frame 70 acts in a direction of extending the bracket 90 at the time of the collision of the vehicle 1. Therefore, the impact load can be absorbed using the ductility of the bracket 90.

In addition, since the rear fixing hole 92r of the side member attachment portion 92 has a C shape in which the outer side in the vehicle width direction is cut out, the side member attachment portion 92 of the bracket 90 is released at the time of the collision of the vehicle 1, thereby suppressing the drop of the frame attachment portion 91. Further, the reference numerals 96 in FIG. 5 indicate a drop-off prevention plate which supports the auxiliary device unit 80 so that the auxiliary device unit 80 may not drop out from the side members 51 and 52 even when the bracket 90 breaks.

At the time of maintenance of the electrical device, it is possible to easily access the electrical device from above by opening a front hood 21 covering the front room 20. The maintenance of the junction box 85 can be done by opening the front hood 21. Further, when maintaining the charger 86, the DC-DC converter 87, and the battery heater 88 accommodated in the auxiliary device accommodation portion 73, it is possible to easily access the electrical device by removing the junction box 85 and the upper frame 72 from above. Therefore, since it is possible to access those electrical devices from above without removing the auxiliary device unit 80 from the vehicle 1, the burden on an operator can be alleviated.

In the auxiliary device accommodation portion 73, the charger 86, the DC-DC converter 87, and the battery heater 88 are vertically stacked and the vehicle-width-directional lengths of the charger 86, the DC-DC converter 87, and the battery heater 88 become shorten as it goes to the lower side. Therefore, those electrical devices can be easily removed during maintenance, and thus the work load can be reduced.

In the embodiment described above, modifications, improvements, and the like can be made as appropriate.

At least the following matters are described in the specification. Although the corresponding component in the above-described embodiment is indicated in parenthesis, the present invention is not limited thereto.

(1) A vehicle (vehicle 1) which includes an electrical device (charger 86), a frame member (auxiliary device frame 70) for holding the electric device, and a bracket (bracket 90) connecting a vehicle structural member and the frame member, in which the frame member includes, a frame main body (frame main body 71) having an electrical device accommodation portion (auxiliary device accommodation portion 73) for accommodating the electrical device and a bracket attachment portion (bracket attachment portion 74) to which the bracket is attached, and an upper frame (upper frame 72) which is attached to the frame main body and covers the electric device accommodated in the electric device accommodation portion, the bracket attachment portion is attached to the bracket in a direction from the bottom to the top, and the upper frame is attached to the frame main body in a direction from the top to the bottom.

According to (1), at the time of assembling the vehicle, the electric device unit having the electric device mounted on the frame member can be assembled from below. In addition, at the time of maintenance of the electrical device, it is possible to access the electrical device from above without removing the electrical device unit from the vehicle, so that the burden on an operator can be reduced.

(2) The vehicle according to (1), in which a plurality of the electric devices (charger 86, DC-DC converter 87, battery heater 88) are vertically stacked in the electric device accommodation portion, and a length of the plurality of electric devices in a vehicle width direction is shortened as it goes to a lower side.

According to (2), the removal of the electrical device becomes easy at the time of maintenance, and thus the work load can be reduced.

(3) The vehicle according to (2), where the frame member includes at least one reinforcing plate (reinforcing plate 75) between the electrical devices, and a length (length L1) of the reinforcing plate in a front and rear direction is longer than a length (length L2) of the frame main body in the front and rear direction.

According to (3), the rigidity of the frame member can be enhanced, and further, at the time of the collision of the vehicle, it is possible to suppress the damage of the electric device by the reinforcing plate receiving the impact.

(4) The vehicle according to any one of (1) to (3), in which the vehicle structural member is a side member (side members 51 and 52) extending in the front and rear direction of the vehicle, and the electrical device is accommodated in a front room (front room 20) provided in front of a compartment with a dashboard (dashboard 3) interposed therebetween.

According to (4), the electric device unit having the electric device mounted on the frame member can be assembled from below to the front room of the vehicle suspended on a production line. Therefore, mixed flow production can be performed on the same production line as a normal engine vehicle.

(5) The vehicle according to (4), in which each bracket includes, a frame attachment portion (frame attachment portion 91) attached to the bracket attachment portion of the frame main body, and a side member attachment portion (side member attachment portion 92) attached to the side member, and the frame attachment portion is located closer to the compartment than the side member attachment portion.

According to (5), since the load applied to the frame member acts in the direction of extending the bracket at the time of the collision of the vehicle, the ductility of the bracket can be used to absorb the impact.

(6) The vehicle according to (5), in which
the side member attachment portion has a fixing hole (front fixing hole 92*f*, rear fixing hole 92*r*) through which a bolt (bolt 94) passes, and
the fixing hole has a C shape in which an outer side in the vehicle width direction is cut out.

According to (6), when the vehicle collides, the frame attachment portion can be prevented from dropping off by releasing the side member attachment portion of the bracket.

(7) The vehicle according to (4) or (5), in which
a high voltage cable is disposed in a space (reinforcing space S4) surrounded by the frame member, the dashboard, and the pair of the side member.

According to (7), at the time of the collision of the vehicle, it is suppressed that the high voltage cable is damaged by the approach of a colliding object and the high voltage cable can be protected by locating them in the reinforcing space.

(8) The vehicle according to (7), in which
the high voltage cable is connected to a cable connection portion (JB connector 85*a*) of another electric device (junction box 85) disposed above the upper frame, from one side (left side) in the vehicle width direction to the other side (right side), and
the high voltage cable is disposed in the space and further on one side in the vehicle width direction than the cable connection portion.

According to (8), at the time of the collision of the vehicle, even when the frame member is pushed to the dashboard side, the collision load acts in a direction to alleviate the bending of the high voltage cable with respect to a connection direction of the cable connection portion, and thus it is possible to suppress breakage and disconnection of the high voltage cable.

The invention claimed is:

1. A vehicle comprising:
a plurality of electrical devices,
a frame member that holds the plurality of electrical devices; and
a bracket connecting a vehicle structural member and the frame member, wherein:
the frame member includes:
a frame main body having an electrical device accommodation portion that accommodates the plurality of electrical devices and a bracket attachment portion to which the bracket is attached; and
an upper frame which is attached to the frame main body and covers the plurality of electrical devices accommodated in the electrical device accommodation portion;
the bracket attachment portion is attached to the bracket in a direction from a bottom of the vehicle to a top of the vehicle in a state where the bracket attachment portion overlaps the bottom of the bracket;
the upper frame is attached to the frame main body in a direction from the top of the vehicle to the bottom of the vehicle; and
the plurality of electrical devices are vertically stacked in the electrical device accommodation portion, in the direction from the top of the vehicle to the bottom of the vehicle, and in an order of longest device width to shortest device width in a vehicle width direction.

2. The vehicle according to claim 1, wherein:
the frame member includes at least one reinforcing plate between the electrical devices; and
a length of the reinforcing plate in a front and rear direction is longer than a length of the frame main body in the front and rear direction.

3. The vehicle according to claim 1, wherein:
the vehicle structural member is a side member extending in a front and rear direction of the vehicle; and
the electrical devices are accommodated in a front room provided in front of a compartment with a dashboard interposed therebetween.

4. The vehicle according to claim 3, wherein:
each bracket includes:
a frame attachment portion attached to the bracket attachment portion of the frame main body; and
a side member attachment portion attached to the side member; and
the frame attachment portion is located closer to the compartment than the side member attachment portion.

5. The vehicle according to claim 4, wherein:
the side member attachment portion has a fixing hole through which a bolt passes; and
the fixing hole has a C shape in which an outer side in the vehicle width direction is cut out.

6. The vehicle according to claim 3, wherein
a high voltage cable is disposed in a space surrounded by the frame member, the dashboard, and the side member.

7. The vehicle according to claim 6, wherein:
the high voltage cable is connected to a cable connection portion of another electrical device disposed above the upper frame, from one side in the vehicle width direction to the other side; and
the high voltage cable is disposed in the space and further on one side in the vehicle width direction than the cable connection portion.

8. The vehicle according to claim 1, wherein:
the vehicle structural member is a side member extending in a front and rear direction of the vehicle; and
the electrical devices are accommodated in a front room provided in front of a compartment with a dashboard interposed therebetween.

9. The vehicle according to claim 2, wherein:
the vehicle structural member is a side member extending in the front and rear direction of the vehicle; and
the electrical devices are accommodated in a front room provided in front of a compartment with a dashboard interposed therebetween.

10. The vehicle according to claim 4, wherein
a high voltage cable is disposed in a space surrounded by the frame member, the dashboard, and the side member.

11. The vehicle according to claim 10, wherein:
the high voltage cable is connected to a cable connection portion of another electrical device disposed above the upper frame, from one side in the vehicle width direction to the other side; and
the high voltage cable is disposed in the space and further on one side in the vehicle width direction than the cable connection portion.

* * * * *